(12) United States Patent
Vippagunta (10) Patent No.: US 8,301,514 B1
(45) Date of Patent: Oct. 30, 2012

(54) SYSTEM, METHOD, AND COMPUTER READABLE MEDIUM FOR PROVIDING RECOMMENDATIONS BASED ON PURCHASE PHRASES

(75) Inventor: Rajendra K. Vippagunta, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 254 days.

(21) Appl. No.: 12/881,565

(22) Filed: Sep. 14, 2010

(51) Int. Cl.
  *G06Q 30/00* (2006.01)
(52) U.S. Cl. .............. 705/26.7; 705/26.41; 705/26.61; 705/14.49; 705/14.51; 705/14.54; 707/711; 707/713; 707/715
(58) Field of Classification Search ........ 705/26.1–27.2, 705/14.4, 14.49, 14.51, 14.54; 707/705–722
See application file for complete search history.

(56) References Cited

U.S. PATENT DOCUMENTS

| 7,376,586 | B1 * | 5/2008 | Partovi et al. ............. 705/26.43 |
| 2002/0019763 | A1 | 2/2002 | Linden et al. |
| 2002/0103787 | A1 * | 8/2002 | Goel et al. ..................... 707/3 |
| 2002/0184095 | A1 * | 12/2002 | Scullard et al. ................. 705/14 |
| 2003/0105682 | A1 | 6/2003 | Dicker et al. |
| 2005/0071251 | A1 | 3/2005 | Linden et al. |
| 2008/0052226 | A1 | 2/2008 | Agarwal et al. |
| 2009/0089183 | A1 * | 4/2009 | Afram et al. .................. 705/27 |

OTHER PUBLICATIONS

Amazon Introduces PayPhrase Payment Shortcut. Anonymous. Informationweek—Online. Manhasset: Oct. 29, 2009.*
Are You "Knick Knack," "Fiction Vixen," or "Relentless Dentist"? Introducing Amazon PayPhrase—the Easy-to-Remember Shortcut to Paying Quickly across the Web and or Amazon.com. Anonymous. Business Wire. New York: Oct. 29, 2009.*
The Washington Times On Technology column. Fred Reed. KRTBN Knight-Ridder Tribune Business News—The Washington Times—WA ,Nov. 10, 2005.*

* cited by examiner

*Primary Examiner* — William Allen
(74) *Attorney, Agent, or Firm* — Knobbe Martens Olson & Bear LLP (57) ABSTRACT

Purchase phrases can be analyzed to infer user interests. A purchase phrase can include one or more user-defined textual words that a user employs to purchase items in an expedited manner. Many users' purchase phrases may include words that reflect the users' interests, such as "golf" or "rose." Users with similar purchase phrases may therefore be interested in purchasing similar items. A recommendation system can therefore find items purchased with similar phrases to a target user's purchase phrase and then recommend these items to the target user.

20 Claims, 6 Drawing Sheets

SYSTEM, METHOD, AND COMPUTER READABLE MEDIUM FOR PROVIDING RECOMMENDATIONS BASED ON PURCHASE PHRASES

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Personalized recommendations can be generated for users in a variety of ways. Many currently-available systems generate recommendations based on a user's interactions in an electronic catalog, which can include user purchases and item selections (e.g., page requests). This catalog activity data can provide indications of users' interests, allowing a recommendation system to find items that match or complement these interests. In general, when more information is known about a user's interests, the recommendation system can generate better recommendations for the user.

Purchase phrases are another source of information that can be analyzed to infer user interests. A purchase phrase can include one or more user-defined textual words that a user employs to purchase items in an expedited manner. Pages that describe items for purchase in an electronic catalog system can include a link or other option to use a purchase phrase to purchase the items. A user can enter or use his or her preferred purchase phrase and optionally other security data, such as a personal identification number (PIN), to purchase an item.

For many users, the users' chosen purchase phrases may include words that reflect the users' interests, such as "golf" or "rose." Users with similar purchase phrases may therefore be interested in purchasing similar items. This disclosure describes embodiments of recommendation systems and processes that find items purchased with similar phrases to a target user's purchase phrase and that recommend these items to the target user.

For purposes of illustration, the processes disclosed herein are described primarily in the context of an electronic catalog system for the purpose of recommending catalog items to users of an e-commerce web site. As will be apparent, however, the disclosed processes can also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, user-generated lists of items, advertisements, other purchase phrases, hyperlinks, item categories, and any type of content or information. In addition, the disclosed processes need not be implemented as part of, or in conjunction with, a web site. Further, although the systems and methods described herein provide recommendations based on purchase phrases, more generally, the systems and methods can provide recommendations based on any transaction phrase used to complete a transaction involving one or more products, services, or other items.

As used herein, the term "item" is used interchangeably to refer to an item itself (e.g., a particular product, service, bundle of products/services or any combination thereof) and to its description or representation in a computer system. As will be apparent from the context in which it is used, the term is also sometimes used herein to refer only to the item itself or only to its representation in the computer system.

II. Overview of Purchase Phrase Recommendations

Figure 1:
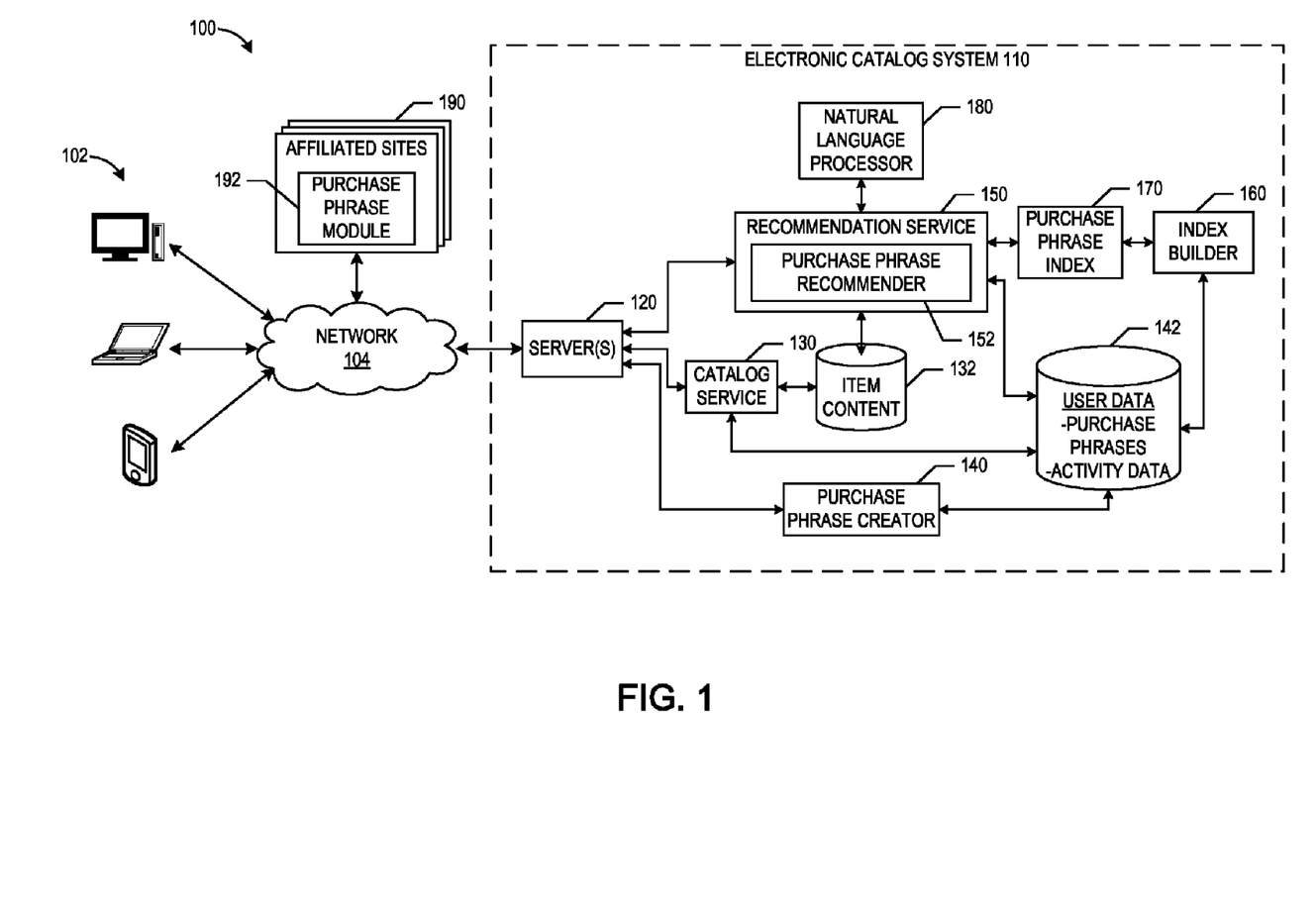
FIG. 1 illustrates an embodiment of a network environment for providing users with access to an electronic catalog system for providing purchase phrase recommendations.

FIG. 1 depicts an embodiment of a network environment 100 suitable for providing users with access to an electronic catalog system 110. In the network environment 100, users can access the electronic catalog system 110 with user systems 102. The electronic catalog system 110 can provide functionality for the users to create purchase phrases and to use these purchase phrases to purchase items. The electronic catalog system 110 can analyze similarities between purchase phrases of different users and can recommend items to users based at least in part on these similarities. Advantageously, in certain embodiments, purchase phrases can provide an additional avenue for inferring user interests and recommending items to users.

The user systems 102 that access the electronic catalog system 110 are computing devices, which can include desktop computers, laptop computers, tablets, personal digital assistants (PDAs), mobile phones, electronic book readers, other wireless handheld devices, set-top or other television boxes, media players, game consoles, or kiosks, among others. The user systems 102 access the electronic catalog system 110 over a network 104, which can be a local area network or a wide area network (including the Internet).

The electronic catalog system 110 can be implemented with one or more physical servers or computing machines. Thus, each of the components depicted in the electronic catalog system 110 can include hardware and/or software for performing various features. In one embodiment, the electronic catalog system 110 is a web site. In the depicted embodiment, the electronic catalog system 110 includes several components. For instance, the electronic catalog system 110 includes one or more servers 120 for receiving and responding to network requests from user systems 102. The one or more servers 120 can include web servers, application servers, database servers, combinations of the same, or the like. The electronic catalog system 110 also includes a catalog service 130 in communication with the one or more servers 120. Users can query a search engine provided by the catalog service 130 to obtain information about electronic catalog content stored in an item data repository 132.

The electronic catalog content can include information about items, such as products and services. In one embodiment, this content is arranged in a hierarchical structure, having items associated with one or more categories or browse nodes in a hierarchy. The electronic catalog system 110 can provide functionality for users to browse the item hierarchy in addition to searching the catalog. Users can select an item represented in the hierarchy or in a list of search results to see more details about an item. In response to a user item selection, the server 120 can provide a catalog page (sometimes called an item detail page) that includes details about the selected item. The user system 102 can render the catalog page using a software program installed on the user system 102, such as a web browser. The user can also select an item to purchase an item. The catalog service 130 can store activity data about user item selections, including item viewing and purchase events, in a user data repository 142.

The electronic catalog system 110 also includes a purchase phrase creator 140. The user systems 102 can access the purchase phrase creator 140 through the servers 120. The purchase phrase creator 140 can provide a user interface for creating purchase phrases. A user can select, type in, or otherwise define a purchase phrase using this user interface. For example, the user interface may provide a text box for a user to enter an arbitrary purchase phrase. The user interface provided by the purchase phrase creator 140 may also suggest purchase phrases or provide a list of phrases from which a user can select a purchase phrase. The purchase phrase creator 140 can allow users to define multiple purchase phrases. The purchase phrases can include one word or multiple words. The purchase phrase creator 140 can store newly-created purchase phrases in the user data repository 142.

Further, in some embodiments, the purchase phrase creator 140 allows users to define restrictions on the use of their or others' purchase phrases. Examples of restrictions can include spending limits, limits on classes or categories of items that can be purchased, and the like. For instance, a parent might create a purchase phrase for a child with a monthly spending limit or allowance. The parent might also restrict the category of items the child can purchase, such as allowing the purchase of only school supplies. Further, the parent might create other age-specific restrictions, such as preventing purchases of rated R movies or music having explicit lyrics.

Because the purchase phrase creator 140 can allow users to create any arbitrary purchase phrase, users may choose a purchase phrase that reflects their interest or interests. For example, a user interested in golf might choose a phrase such as "golf master" or "putting king." A user interested in gardening might pick a phrase such as "green thumb" or "rose garden." This assumption about user interests can motivate generating recommendations based on purchase phrases.

As described above, purchase phrases can be used by users to expedite the processing of online orders. In other implementations, money can be sent to a user's purchase phrase, or in other words, to the user identified by the purchase phrase. Likewise, gifts can be sent to a user identified by a certain purchase phrase. Money or gifts can also be requested from a user identified by a purchase phrase. Many other uses of purchase phrases are possible, including some uses that do not involve purchases.

A recommendation service 150 included in the electronic catalog system 110 can generate recommendations for users. The recommendation service 150 can generate recommendations using any of a variety of algorithms, including algorithms that analyze user activity data regarding user item selections. In the depicted embodiment, the recommendation service 150 includes a purchase phrase recommender 152 that can generate recommendations based on user purchase phrases in addition to information regarding user item selections.

Figure 4:
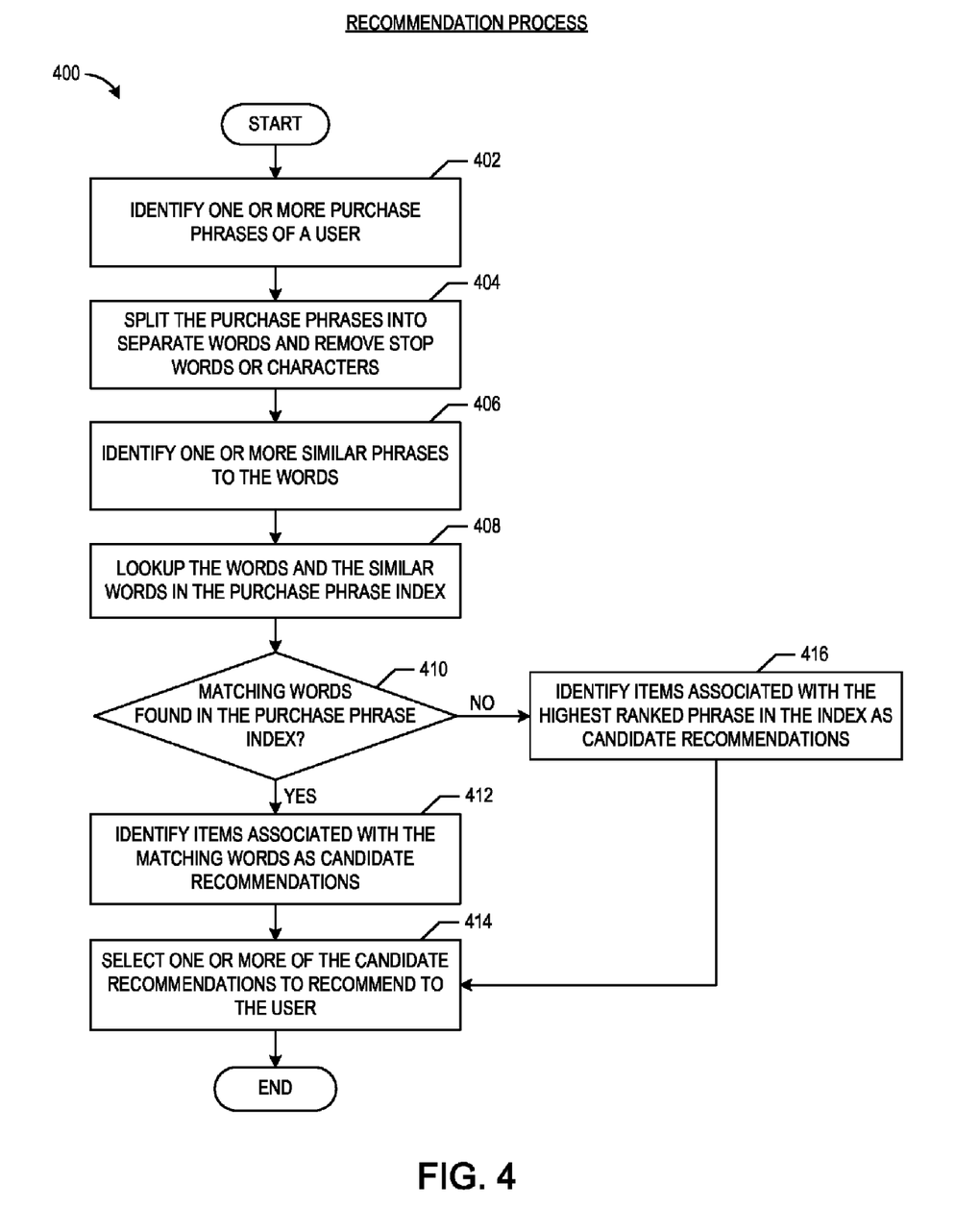
FIG. 4 illustrates an embodiment of a recommendation process that employs a purchase phrase index to generate recommendations.
Figure 5:
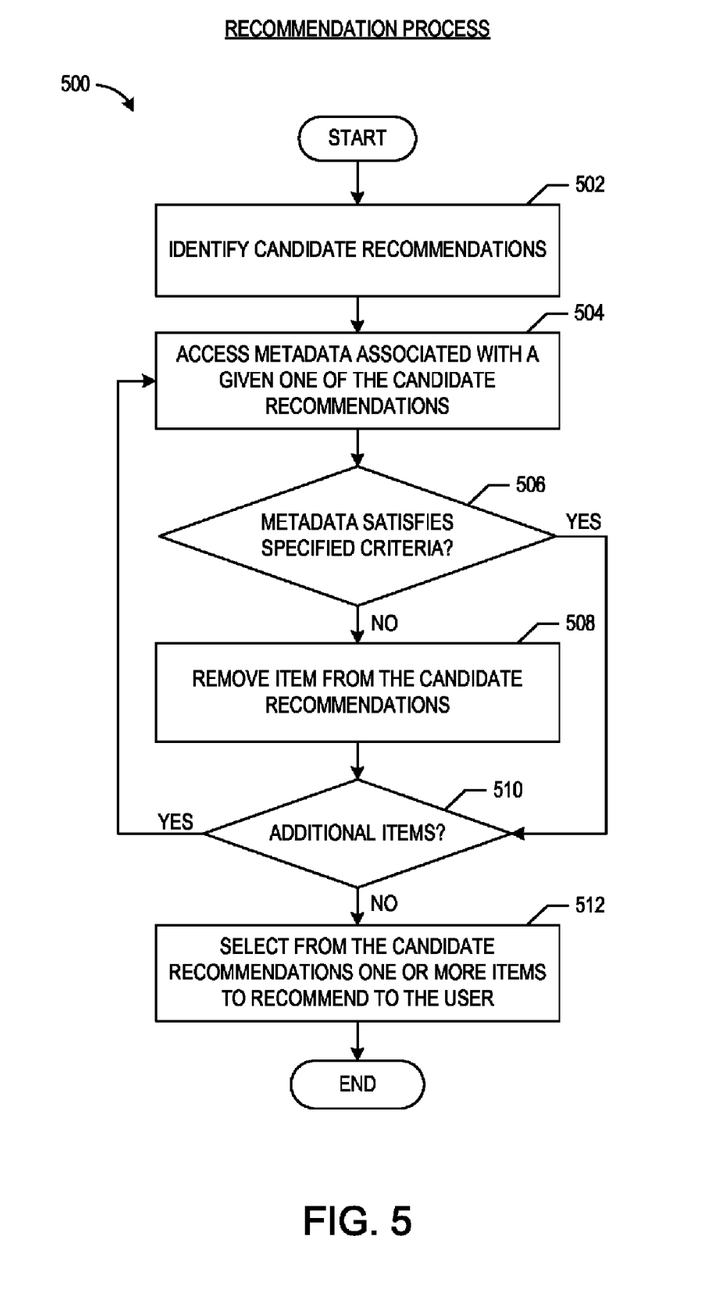
FIG. 5 illustrates another embodiment of a recommendation process.

In one embodiment, the purchase phrase recommender 152 identifies purchase phrases of other users that are similar to a purchase phrase of a target user. Many factors can be considered when determining whether two purchase phrases are similar, and similarity is discussed in detail below with respect to FIG. 4. The purchase phrase recommender 152 can identify items purchased with the similar purchased phrases and select at least some of these items to recommend to the target user. For example, if the target user's purchase phrase is "golf master," the purchase phrase recommender 152 might identify another user's similar purchase phrase of "rather be golfing." Since both phrases reference golf, the purchase phrase recommender 152 can identify items purchased with the "rather be golfing" purchase phrase and recommend one or more of these items to the target user. FIGS. 4 and 5 describe example techniques for generating purchase phrase recommendations in more detail.

The purchase phrase recommender 152 can obtain data about similar purchase phrases. Similar purchase phrases can include terms that are identical, in a different tense (e.g., present, past), synonyms, similar sounding words, and other related terms. In one embodiment, the purchase phrase recommender 152 accesses a natural language processor 180, which uses natural language processing techniques to analyze find similarities among purchase phrases. The purchase phrase recommender 152 can also access a stored library of words, a stored thesaurus, or the like to look up similar words instead of using a natural language processor 180.

The purchase phrase recommender 152 can index or look up the purchase phrases and the similar words to the purchase phrases in a purchase phrase index 170 to find related item purchases. The purchase phrase index 170 can be a map, associative array, or the like that maps purchase phrases (or portions thereof) to items purchased with those purchase phrases. An index builder 160 can generate this purchase phrase index 170 by analyzing the purchase phrases and activity data of users stored in the user data repository 142. The purchase phrase recommender 152 can select one or more of the purchased items obtained from the index and present these selected items as recommendations for a user.

The electronic catalog system 110 can also provide purchase phrase functionality as a service to other web sites or network applications. Affiliated sites 190 are shown connected to the network 104, which can use at least some of the purchase phrase features described herein. The affiliated sites 190 can be web sites or the like. The affiliated sites 190 can be operated by entities who are different from one another and who are different from an operator of the electronic catalog system 110.

Each of the affiliated sites 190 includes a purchase phrase module 192 in the depicted embodiment. The purchase phrase module 192 can be a widget, snippet of code, or even simply a link that provides access to the purchase phrase functionality of the electronic catalog system 110. For instance, the purchase phrase module 192 can allow users of the affiliated sites 190 to create purchase phrases by accessing the purchase phrase creator 140 and to use those purchase phrases to purchase items on the affiliated sites 190. The purchase phrase module 192 can also access recommendations from the recommendation service 150 and provide these recommendations to users of the affiliated sites 190. In alternative embodiments, the purchase phrase module 192 can incorporate some or all of the functionality of the purchase phrase creator 140, the purchase phrase recommender 150, and the index builder 160. Features for providing recommendations to these users are described in greater detail below with respect to FIG. 5.

Users of the affiliated sites 190 can also be, but need not be, users of the electronic catalog system 110. In one embodiment, the electronic catalog system 110 includes an identifier mapping service (not shown) that maps user identifiers (IDs) from an affiliated site 190 to user identifiers stored with the electronic catalog system 110. This identifier mapping service can be used to provide recommendations for users of the affiliated sites 190 based on their purchase phrases associated with those affiliated sites 190. For instance, in one embodiment, a user of an affiliated site 190 (such as a social network or other site) may have a particular identifier (e.g., user name) with that site 190. The purchase phrase recommender 152 can user the identifier mapping service to access the user name of the user in a data repository to determine the user's ID (e.g., user name) with the electronic catalog system 110. The user may have provided the user's affiliated site 190 user name to the electronic catalog system 110 during account creation or thereafter. The purchase phrase recommender 152 can then recommend items to the user on the electronic catalog system 110 or on the affiliated site 190 based on, for example, the user's purchase phrase with the affiliated site 190. The purchase phrase recommender 152 can provide these recommendations to the purchase phrase module 192, which can output the recommendations for presentation to the user on the affiliated site 190.

As described above, the recommendation of items by the purchase phrase recommender 152 is not necessarily restricted to products or services. Instead, many other types of items can be recommended, some examples of which are mentioned above. One example of such items includes other purchase phrases. A user who is trying to select a purchase phrase can be recommended purchase phrases that are similar to text that the user enters into a text field or the like. The user can adopt a new purchase phrase that may be used in addition to or instead of the user's original purchase phrase (if the user already has one) based on the recommendation. In one embodiment, the purchase phrase recommender 152 identifies purchase phrases of the user's friends (e.g., from data obtained from an affiliated site 192 or from the user data repository 142) and recommends one or more similar purchase phrases to the user.

Another type of item that can be recommended is an item category. For instance, if a user's purchase phrase is similar to the name of a category in the item data repository 132, the purchase phrase recommender 152 can recommend the entire category of items to the user. Recommending a category can be particularly useful if a sale or promotion is taking place with respect to the category. Thus, for example, the recommendation can be accompanied by a message such as "you might like today's promotion in the electronics category." Many other variations in recommending items are possible.

The processing of the various components of the electronic catalog system 110 can be distributed across multiple machines, networks, and other computing resources. The various components of the electronic catalog system 110 can also be implemented in one or more virtual machines, rather than in dedicated servers. Likewise, the data repositories shown can represent physical and/or logical data storage, including, for example, storage area networks, network attached storage, or other shared disk storage systems. Moreover, in some embodiments the connections between the components shown represent possible paths of data flow, rather than actual connections between hardware. While some examples of possible connections are shown, any of the subset of the components shown can communicate with any other subset of components in various implementations.

III. Purchase Phrase Index Building Embodiments

Figure 2:
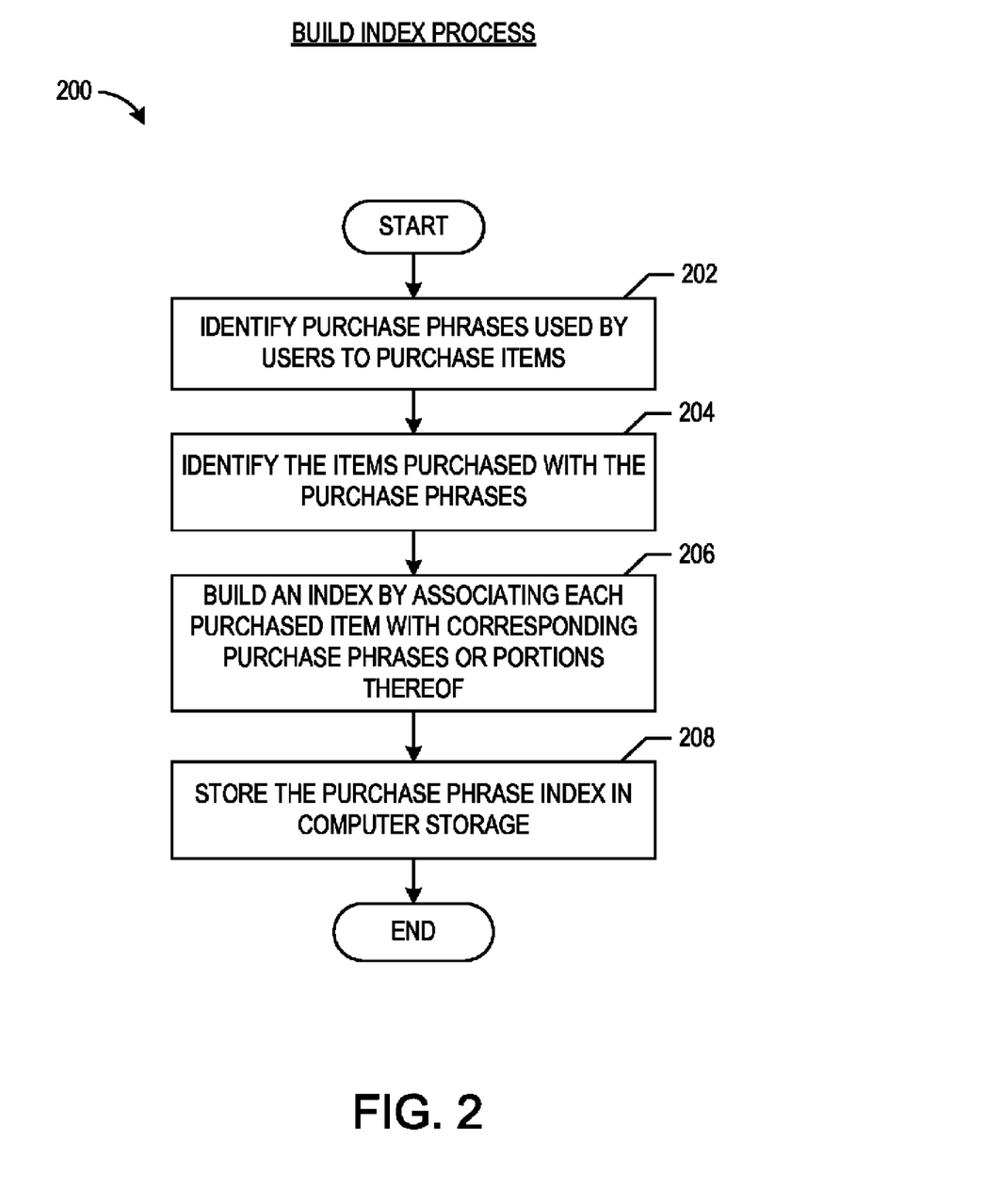
FIG. 2 illustrates an embodiment of a purchase phrase index building process for mapping user-defined purchase phrases to items in the electronic catalog system.

FIG. 2 illustrates an embodiment of an index building process 200 for mapping user-defined purchase phrases to items in the electronic catalog system 110. FIG. 2 provides a general overview of index building, and index building is illustrated in greater detail below with respect to FIG. 3. The index building process 200 can be implemented by the electronic catalog system 110. In particular, the process 200 can be implemented by the index builder 160.

At block 202, purchase phrases used by users to purchase items are identified. Similarly, at block 404, the items purchased with the purchase phrases are identified. The index builder 160 can identify the purchase phrases and the items purchased with those phrases from the user data repository 142.

At block 206, an index can be built from the identified purchase phrases and purchased items by associating or mapping each purchased item with corresponding purchase phrases or portions thereof. As some users may have purchased multiple items with their purchase phrases, the index can map a single purchase phrase to one or multiple purchased items. Any suitable data structure can be used to store the purchase phrase index. The purchase phrase index is stored in computer storage at block 208, where it can be accessed by the recommendation service 150.

The purchase phrase index can be rebuilt periodically to incorporate new purchase information that occurs over time. The purchase phrase index can also be built as an offline or background process, continually running or running whenever purchase updates occur. With a pre-built purchase phrase index, the recommendation algorithm can rapidly access data contained in the index so as to provide recommendations in real time or near-real time. Alternatively, the purchase phrase index can be built in real time or near-real time in response to a request for recommendations.

Some users with purchase phrases may not yet have made purchases with their purchase phrases. Instead, these users may have made purchases using other mechanisms, such as by logging in with a username and password. In one embodiment, identifying the items purchased can include identifying items purchased using these other purchase mechanisms. When building the index, the index builder 160 can associate purchase phrases of such users with the items that were purchased using other purchase mechanisms.

Figure 3:
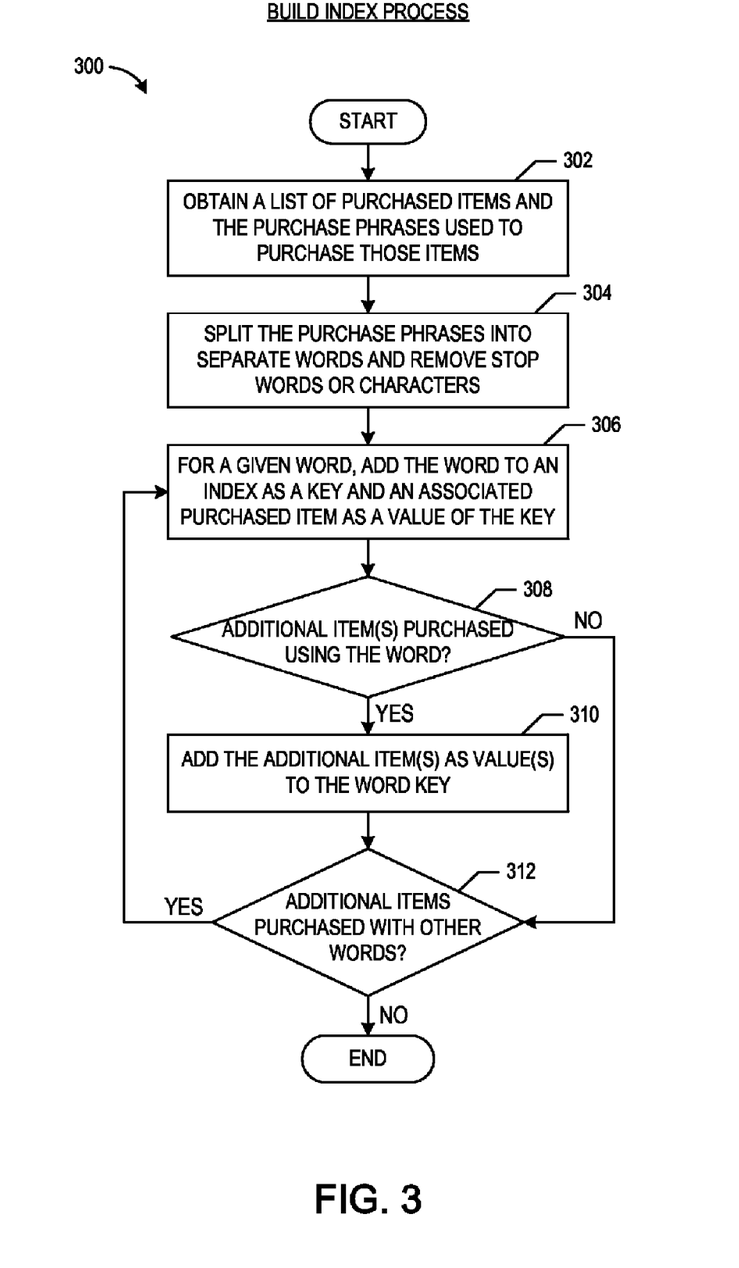
FIG. 3 illustrates another embodiment of a purchase phrase index building process.

FIG. 3 illustrates a more detailed embodiment of an index building process 300. The index building process 300 can be implemented by the electronic catalog system 110. In particular, the process 300 can be implemented by the index builder 160.

At block 302, a list of purchased items and the purchase phrases used to purchase those items is obtained. This list can be obtained from the user data repository 142 and can be in the form of a comma-delimited list or the like, for example, <purchase phrase>, <item>. The item can be identified by a product number, title, or some other identifier. While the purchase phrases and items may originate with the electronic catalog system 110, they can also include originate from any of the affiliate sites 190. Thus, the list can include purchase phrases of users of the affiliate sites 190 and items purchased from the affiliate sites 190. The list can also include phrases and items from both the electronic catalog system 110 and one or more affiliate sites 190.

The purchase phrases are split into words having more than three characters at block 304. Splitting the purchase phrases in this manner can eliminate stop words like "is," "the," and "and" from the index. Other, longer stop words can also be removed. Little or no user interests can be inferred from stop words, and hence, removing the stop words can improve the efficiency of recommendation algorithms that use the purchase phrase index. Purchase phrases may not be split in some embodiments, including embodiments where purchase phrases include single words.

For a given word, at block 306, the word is added to an index as a key. An associated purchased item is added as a value of the key. Thus, if a phrase "golf master" was used to purchase a golf club, the word "golf" or the word "master" can be assigned as a key and the golf club item can be the value of the key. (As will be seen below with respect to blocks 308 and 310, both the words "golf" and "master" would be assigned as keys for the golf club item.) In addition, in some embodiments, metadata can be stored in association with the word and/or the purchased item. Metadata stored with the purchase phrase word can include a venue where the purchase phrase was used, such as on the electronic catalog system 110 or on an affiliate site 190. This metadata can instead be associated with the purchased item, to indicate where the item was purchased. Other metadata that can be stored in association with a purchased item can include metadata related to item restrictions (such as movie ratings, song lyric ratings, etc.), prices of items, item categories, and the like. The purchase phrase recommender 152 can use this metadata to provide targeted recommendations using the techniques described in greater detail below with respect to FIG. 5.

At block 308, it is determined whether one or more additional items were purchased using the word. If so, the additional item or items are added as value(s) to the word key at block 310. Thus, for example, after the word "golf" of the purchase phrase "golf master" is mapped to one or more items, the word "master" can be mapped to those same items. Multiple purchases can therefore be associated with purchase phrases or portions thereof. The process 300 then proceeds to block 312. Likewise, if it is determined that no additional items were purchased using the word at block 308, the process also proceeds to block 312. It is further determined at block 312 whether additional items were purchased with other words. If so, the process 300 loops back to block 306; otherwise, the process 300 ends.

Optionally, the purchase phrase index can be sorted, for example, to rank the purchase phrase words according to the number of items associated with those words. In one embodiment, purchase phrase words with more mapped items have a higher rank than purchase phrase words with fewer mapped items. This ranking can be used in various recommendation algorithms.

IV. Purchase Phrase Recommendations Embodiments

FIG. 4 illustrates an embodiment of a recommendation process 400 that can use a purchase phrase index to generate recommendations. The recommendation process 400 can be implemented by the electronic catalog system 110. In particular, the recommendation process 400 can be implemented by the purchase phrase recommender 152. Advantageously, in certain embodiments, the recommendation process 400 provides recommendations based on similar purchase phrases.

At block 402, one or more purchase phrases of a user are identified. If a user has multiple purchase phrases, some or all of them may be identified. At block 404, the purchase phrases are split into words having more than three characters, for the same reasons discussed above with respect to FIG. 3. Other stop words can also be removed.

One or more similar phrases to the words are identified at block 406. The similar phrases can include synonyms of the words, similar sounding words, and the like. Similar sounding words can include rhymes, homonyms, homophones, malapropisms, and the like. Other related words can also be identified, including words that have the same root (such as "golfer" and "golfing", with a root word of "golf"). Related words can also include words from a related category or class of words, such as different words used to describe the same or similar genre of music (e.g., "rap" and "hip hop"). These similar phrases can be identified by the natural language processor 180 of FIG. 1 or can be programmatically retrieved from a data dictionary or the like.

At block 408, the words of the user's purchase phrase(s) and the similar words are used to index into the purchase phrase index. It is then determined whether matching words were found in the purchase phrase index at block 410. If a word matches (e.g., a purchase phrase word has a corresponding key in the index), then the items associated with that word are identified. Once each of the words has been indexed into the purchase phrase index, one or more of the items mapped to the matching words are selected to recommend to the user at block 412.

To illustrate, suppose that a user's various purchase phrases included the words "car" and "chocolate." Similar words for these words can be found by the purchase phrase recommender 152, such as "auto" and "vehicle" for the word "car" and "confection" and "candy" for the word "chocolate." The purchase phrase recommender 152 can then look up each of the words "car," "auto," "vehicle," "chocolate," "confection," and "candy" in the purchase phrase index. One or more of these words may have matches in the index, in which case, the purchase phrase recommender 152 identifies the items associated with the matching words. These items are candidate recommendations. The purchase phrase recommender 152 can then select a subset of these candidate recommendations to present as recommendations to a user.

Selecting the subset of candidate recommendations can be performed in a variety of ways. In one embodiment, the candidate recommendations are ranked, and a most highly-ranked subset of the candidate recommendations are selected as the actual recommendations. One way to assign rankings to the candidate recommendations is to weight the candidate recommendations according to the method used to obtain them. For example, candidate recommendations obtained directly from the words of a user's purchase phrase can be ranked higher than candidate recommendations obtained from a related word, synonym, or similar sounding word. Likewise, candidate recommendations obtained from a similar sounding word or related category can be ranked lower than candidate recommendations obtained from synonyms or related words. Many permutations of such weightings can be applied in different implementations. Further, candidate recommendations can be ranked based on the number of items that were associated with a given word.

Referring again to FIG. 4, if at block 410, no matching words were found in the purchase phrase index, other items can be identified at block 416 to recommend to the user. Specifically, in the depicted embodiment, items associated with the highest ranked phrase in the index (see FIG. 3) can be identified as candidate recommendations. In other words, popular items can be selected as a fallback mechanism for providing recommendations to the user. One or more of these items can be selected as the actual recommendations at block 414.

FIG. 5 illustrates another embodiment of a recommendation process 500. The recommendations process 500 builds on the recommendations process 400, adding additional features. In particular, in certain embodiments, the process 500 applies a metadata filter to the candidate recommendations identified by the process 400. Like the recommendations process 400, the recommendations process 400 can be implemented by the purchase phrase recommender 152 of the electronic catalog system 110.

At block 502, candidate recommendations are identified. This block can include performing blocks 402 through 412 of the recommendations process 400. At block 504, metadata associated with one of the candidate recommendations is accessed. The metadata corresponds to the metadata added during index building described above with respect to FIG. 3. This metadata can be accessed from the purchase phrase index and can include information about the item or the purchase phrase used to purchase the item. The purchase phrase recommender 152 can access different metadata to generate different types of recommendations. Examples of different types of recommendations that may be generated include recommendations for users having a purchase phrase allowance, recommendations for users with restricted purchase phrases, and recommendations for users of the affiliated sites 190.

For example, if the purchase phrase recommender 152 is generating recommendations for a user that has a purchase phrase allowance, the purchase phrase recommender 152 can examine metadata regarding the price of the candidate recommendation. If the price of the candidate recommendation is below the allowance (or the current unused allowance), the purchase phrase recommender 152 can consider the item to be a potential recommendation. Otherwise, the purchase phrase recommender 152 may remove the item from the candidate recommendations. Similarly, if the user has a purchase phrase restriction, such as that the user cannot purchase movies with an "R" rating, the purchase phrase recommender 152 may filter out candidate recommendations with such a rating. As another example, if the user has a purchase phrase associated with an affiliate site 190, the purchase phrase recommender 152 can select items for recommendation that come from the affiliate site 190. These items can be recommended to users of the affiliate site 190.

In one embodiment, these items are recommended in response to the items being popular sellers on the affiliate site. Popularity of the items can be determined in a variety of ways. For instance, metadata representing the sales rank of the items can reflect their popularity. In addition, the purchase phrase module 192 can communicate purchases on affiliated sites 190 to the electronic catalog system 110. A component of the electronic catalog system 110 (such as the catalog service 130) can compute the number, frequency, or other statistic regarding the sales to determine which items are popular. The catalog service 130 can store this popularity information as metadata in the item content data repository 132, and the index builder 160 can include this popularity metadata in the purchase phrase index 170. The purchase phrase recommender 152 can use this popularity information to recommend popular items to users of the affiliated sites 190 and/or users of the electronic catalog system 110. Popularity data can be tracked over a certain time frame, such as within a day, so that users are recommended items that are currently popular. In one embodiment, the purchase phrase module 192 on the affiliated sites 190 can be programmed to report items on sale or promotion to the electronic catalog system 110, and the purchase phrase recommender 152 can recommend these items as popular items.

Thus, at block 506, it is determined whether the metadata satisfies certain specified criteria, such as the price being below the purchase phrase allowance. If the criteria is not satisfied, the item is removed from the candidate recommendations at block 508. Otherwise, it is determined whether additional items remain to be examined at block 510. If so, the recommendation process 500 loops back to block 504 to analyze additional candidate recommendations. In an alternative embodiment, the outputs of the block 506 can be reversed, such that if the metadata satisfies the specified criteria, the candidate recommendation can be added to a new candidate recommendations list. Then, if the candidate recommendation does not satisfy the specified criteria, no action takes place.

At block 512, a subset of the candidate recommendations are selected to recommend to the user. The weightings described above with respect to FIG. 4 can be applied in block 512 to rank the candidate recommendations. In addition to or instead of the ranking criteria described above, the metadata can be used to rank the candidate recommendations. Items that more closely match the specified criteria, such as movies with a "PG" rating, may be ranked higher than items that less closely match the criteria, such as movies with a "PG-13" rating.

It should be apparent that the purchase phrase recommender 152 can consider multiple types of metadata when generating recommendations. For a user that has both a purchase phrase allowance and purchase phrase restrictions, for instance, the purchase phrase recommender 152 can search for both types of metadata when generating recommendations.

Although the process 500 has been described as a metadata filter for the process 400, the features of the process 500 can be implemented in-line with the process 400. For instance, the initial list of candidate items can be selected by searching for items that are both similar to the user's purchase phrase words and that satisfy the specified metadata. Many other processing orders are possible.

Figure 6:
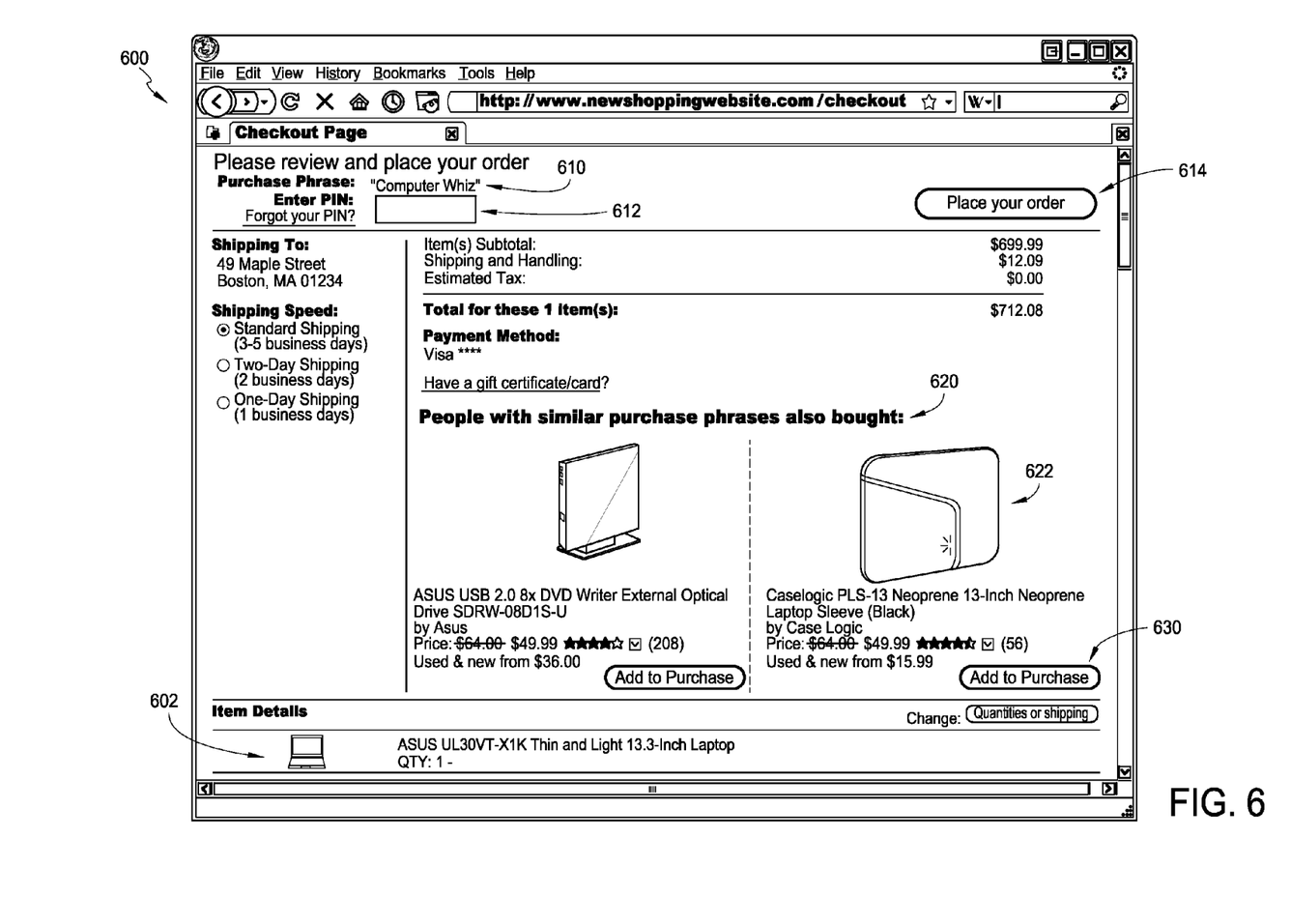
FIG. 6 illustrates an embodiment of a user interface depicting example recommendations generated based on purchase phrases.

FIG. 6 illustrates an embodiment of a user interface 600 depicting example recommendations generated based on purchase phrases. The user interface 600 can be output by the purchase phrase recommender 152, provided to the server 120, and transmitted over the network 104 to one of the user systems 102. The user system 102 can render the user interface 600, for example, in a web browser or other application. The user interface 600 can also be provided by one of the affiliate sites 190, using the purchase phrase module 192.

The example user interface 600 shown depicts a checkout page of an e-commerce web site. The checkout page can be reached by a user selecting an item 602 to purchase. In the depicted embodiment, the checkout page is reached via user using a purchase phrase 610. The purchase phrase 610 shown in this example includes the words "computer whiz." A text box 612 is provided for a user to enter a PIN 612 for security purposes. A "place your order" button 614 allows the user to complete the purchase transaction.

Advantageously, in the depicted embodiment, purchase phrase recommendations 622 are shown. These recommendations 622 include items that may be identified, for example, using any of the purchase phrase recommendation techniques described above. A textual explanation 620 for the recommendations 622 is provided, explaining to the user that "people with similar purchase phrases also bought" the recommended items 622. "Add to purchase" buttons 630 are also provided for combining the recommended items 622 with the current purchase.

The user interface 600 and placement of recommendations 622 are merely illustrative examples and can be varied in other implementations. For instance, the recommendations 622 can be provided on a shopping cart page, a thank-you page (e.g., that appears after a user purchase an item), a dedicated recommendations page, on a product information page, in-line with search results, or the like. Recommendations 622 can also be provided in emails, in advertisements on web pages, and in other media. The recommendations 622 need not be automatically generated but can be provided in response to a user request for recommendations (e.g., by clicking a "recommendations" link or the like). Many other configurations for presenting purchase phrase recommendations to users are possible.

V. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:
1. A system for using purchase phrases to generate recommendations, the system comprising:
 a computer system comprising computer hardware, the computer system programmed to implement:
 a purchase phrase index builder configured to:
 identify purchase phrases used by a plurality of users of an electronic catalog system to purchase items represented in the electronic catalog system, and build a purchase phrase index by at least associating each of the purchased items with the purchase phrases used to purchase the items;
a natural language processor configured to identify one or more similar purchase phrases that are at least similar to a purchase phrase created by a target user; and
a purchase phrase recommender configured to generate recommendations for the target user by at least:
using at least the identified one or more similar purchase phrases to identify one or more of the purchased items as candidate recommendations from the purchase phrase index, and
selecting one or more items from the one or more candidate recommendations to present to the target user as the recommendations.

2. The system of claim 1, further comprising a purchase phrase creator, the purchase phrase creator configured to output a user interface comprising functionality for the plurality of users to create the purchase phrases.

3. The system of claim 1, wherein the purchase phrase recommender is further configured to generate the recommendations in response to a user adding an item to an electronic shopping cart with the purchase phrase created by the target user.

4. The system of claim 1, wherein the purchase phrase recommender is further configured to apply a metadata filter to identify the candidate recommendations.

5. A method of generating item recommendations, the method comprising:
by a computer system comprising computer hardware:
accessing a transaction phrase index comprising a plurality of transaction phrases mapped to items purchased using the transaction phrases;
identifying a transaction phrase created by a target user;
identifying candidate recommendations from the transaction phrase index based at least partly on the identified target user transaction phrase, the candidate recommendations comprising one or more of the purchased items contained in the transaction phrase index; and
selecting one or more of the candidate recommendations to present to the target user as item recommendations.

6. The method of claim 5, wherein said identifying candidate recommendations comprises using the target user transaction phrase to index into the transaction phrase index.

7. The method of claim 5, wherein said identifying candidate recommendations comprises using a similar phrase that is similar to the target user transaction phrase to index into the transaction phrase index.

8. The method of claim 7, wherein the similar transaction phrase comprises at least one of the following: a synonym of the target user transaction phrase and a similar sounding word of the target user transaction phrase.

9. The method of claim 8, further comprising weighting first candidate recommendations obtained by indexing the target user transaction phrase higher than second candidate recommendations obtained by indexing the synonym of the target user transaction phrase.

10. The method of claim 5, wherein said identifying candidate recommendations further comprises identifying metadata associated with the purchased items contained in the transaction phrase index.

11. The method of claim 10, wherein said identifying candidate recommendations further comprises filtering the candidate recommendations based at least partly on types of the purchased items.

12. The method of claim 11, wherein said filtering comprises removing selected purchased items from the candidate recommendations that are restricted from purchase by the target user.

13. The method of claim 10, wherein said identifying candidate recommendations further comprises filtering the candidate recommendations based at least partly on a venue where the purchased items were sold.

14. The method of claim 10, wherein said identifying candidate recommendations further comprises filtering the candidate recommendations based at least partly on electronic catalog categories associated with the purchased items.

15. The method of claim 5, wherein the items comprise services.

16. A non-transitory computer-readable storage medium comprising computer-executable instructions for implementing a method of analyzing purchase phrases, the method comprising:
obtaining a list of purchased items and purchase phrases used to purchase the purchased items, the purchase phrases being used by a plurality of users to purchase the items from an electronic catalog system;
building a purchase phrase index by at least associating each of the purchased items with at least a portion of the purchase phrases used to purchase the items;
storing the purchase phrase index in computer storage;
accessing the purchase phrase index to identify a purchase phrase used by a target user; and
generating one or more recommendations for the target user based at least partly on the identified purchase phrase, the one or more recommendations being selected from the purchased items stored in the purchase phrase index.

17. The computer-readable storage medium of claim 16, wherein said building the purchase phrase index comprises splitting the purchase phrases into individual words.

18. The computer-readable storage medium of claim 17, wherein said building the purchase index further comprises selecting the words having more than three characters to produce a set of keys.

19. The computer-readable storage medium of claim 18, wherein said building the purchase index further comprises associating the purchased items with the keys as values of the keys, such that each of the word keys is associated with one or more of the purchased item values.

20. A system for analyzing purchase phrases, the method comprising:
a computer system comprising one or more computing devices, the computing system configured to:
obtain a list of purchased items and purchase phrases used to purchase the purchased items, the purchase phrases being used by a plurality of users to purchase the items from an electronic catalog system;
build a purchase phrase index by at least associating each of the purchased items with at least a portion of the purchase phrases used to purchase the items;
store the purchase phrase index in computer storage;
access the purchase phrase index to identify a purchase phrase used by a target user; and
generate one or more recommendations for the target user based at least partly on the identified purchase phrase, the one or more recommendations being selected from the purchased items stored in the purchase phrase index.

* * * * *